Nov. 16, 1926. 1,607,182
W. W. BAKER
INDICATOR FOR AUTOMATIC METAL WORKING MACHINES
Filed August 5, 1924 2 Sheets-Sheet 2

INVENTOR.
Walter W. Baker
BY Parsons & Bodell
ATTORNEYS.

Patented Nov. 16, 1926.

1,607,182

UNITED STATES PATENT OFFICE.

WALTER W. BAKER, OF SYRACUSE, NEW YORK.

INDICATOR FOR AUTOMATIC METAL-WORKING MACHINES.

Application filed August 5, 1924. Serial No. 730,310.

This invention relates to automatic metal working machines or so called automatic screw machines, in which the work is automatically fed to the tool or tools automatically fed into operative relation to the work, and has for its object a particularly simple and efficient means controlled by the absence of stock or work in the machines to indicate the absence of work to the operator.

The invention consists in the novel features and in the combinations and constructions hereinafter set forth and claimed and described.

In describing this invention, reference is had to the accompanying drawings in which like characters designate corresponding parts in all the views.

Figure 1:
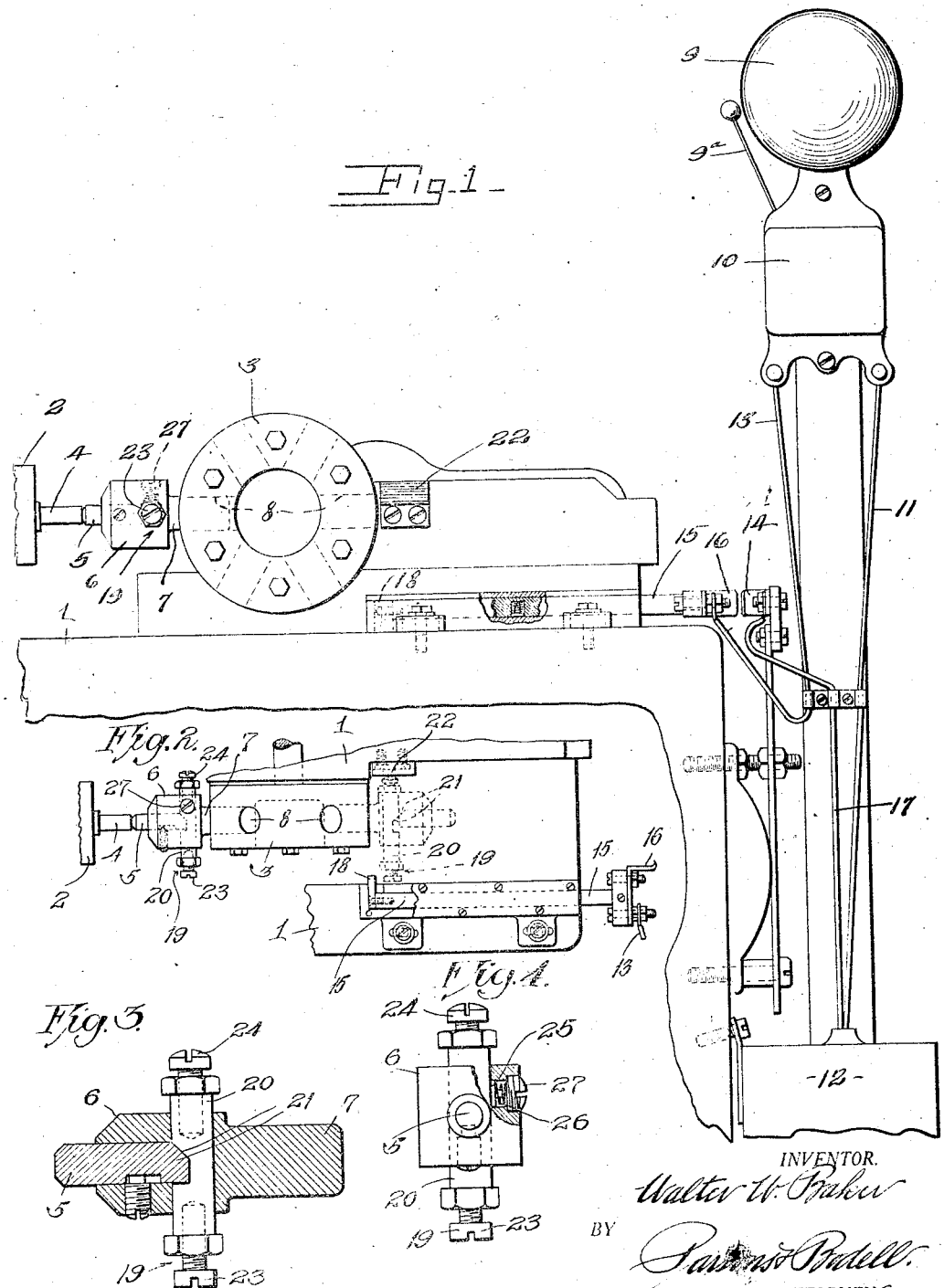
Figure 1 is a fragmentary side elevation of a conventional automatic screw machine embodying my invention.
Figure 2:
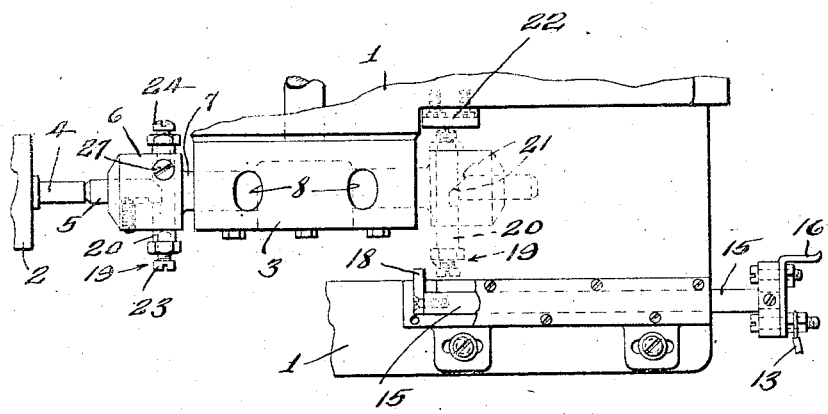
Figure 2 is a fragmentary plan view of parts seen in Figure 1.
Figure 3:
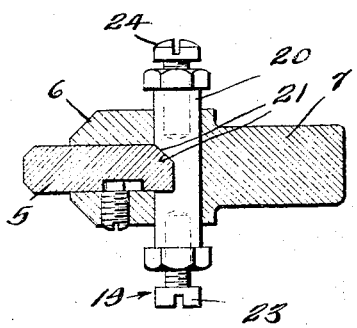
Figure 3 is a lengthwise sectional view through the tool holder.
Figure 4:
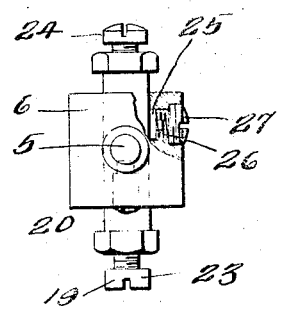
Figure 4 is an elevation partly broken away of the tool holder looking to the right in Figure 2.

This invention comprises means controlled by the absence of work in an automatic metal working or screw machine to indicate to the operator that the work in the machine has become exhausted.

1 designates the frame of the machine, 2 the spindle and 3 the tool head. As will be understood by those skilled in the art, screw machines are provided with suitable means for automatically feeding the work to the tool and the tool head is automatically actuated to bring the tool or tools into and out of operative relation to the work in the proper sequence and as the construction and operation of such automatic machines is well known and forms no part of this invention, full description of such machines is thought to be unnecessary.

4 designates the work as a rod which is automatically fed, step by step from the rotating spindle 2.

5 designates the tool carried by a tool holder 6 supported in the tool head 3. This tool may perform a boring, threading, tapping or various operations and the head may be provided with a number of tools to perform operations on the work in sequence, also the machine is provided with the usual means for cutting off the work from the stock, that is, cutting off the rod 4 after the work has been performed thereon.

In the illustrated embodiment of my invention, the tool holder 6 is provided with a shank 7 fitting in a socket 8 in the revolving tool head 3 and the tool 5 is arranged to be shifted by the work or rod 4 as it is fed the proper distance out of the spindle 2.

If the work has been exhausted, the tool will not shift axially into effective position and hence the indicating means to be described will operate.

This indicating means is here shown as a signal as an electric bell 9 having a hammer $9^a$ operated by electroresponsive elements or magnets located within a casing 10. The magnets are connected in a normally open electric circuit, one side of which is connected by a wire 11 to a battery cell 12 and the other side of which is connected by a wire 13 to a contact 14 and to the battery through a normally open switch 15 having a contact 16 movable into engagement with the contact 14, the contact 14 being connected to the battery through a wire 17. The contacts 16 and 14 are normally separated and are closed by a member normally held in inoperative position by the work 4 through the tool 5 as the work is fed from the spindle.

The switch member 15 is here shown as a slide suitably mounted on the frame of the machine and having an arm 18 normally arranged in the path of a controlling member 19 which is operated by the tool 5. This member is here shown as a slide 20 extending transversely through the head of the tool holder 6, the slide and the tool having coacting means as cam faces at 21, by which movement of the slide 20 in one direction moves the tool in effective position relatively to the work and movement of the tool in the opposite direction by the work 4 when being fed from the spindle 2 moves the slide to ineffective position, that is out of the path of the arm 18 of the switch 15.

The slide 20 in the normal operation of the machine, that is when there is work to be operated upon, is reset to project the tool outwardly axially into effective position as the tool head 3 revolves to carry the tool into working position, that is after the slide or controlling member 20 has been carried by the tool head 3 past the arm 18, by a cam 22 carried by the frame 1 in the path of one end of the slide 20.

The slide 20 is here shown as provided with adjustable contacts at its opposite ends, one for engaging the arm 18 and the other for engaging the arm 22. These adjustable contacts are shown as screws 23, 24 threading in opposite ends of the slide 20, also the slide is acted upon by a suitable friction shoe 25 carried in the head of the tool holder 6 and pressed against the slide by a spring 26 interposed between the shoe and the screw 27 threading in the head 6.

In the normal operation, assuming that the work or rod 4 has been set in position for the first operation, the tool 5 arranged to perform the operation and the machine started, the tool 5 completes its operation and the work is cut off in the well known manner, the tool head 3 rotates and during the initial part of such rotation of the head the work or stock in the machine is pressed axially into the tool holder and shifts the tool 5 and the control member 20 to its inoperative position so as the tool head 3 rotates, the control member 20 clears and hence does not operate, the arm 18 of the switch 15, and thereafter the end 24 thereof engages the cam 22 which pushes the control member or slide 20 causing it to project the tool 5 out of the tool holder to ineffective position. As the tool head 3 continues to rotate, it brings the tool into alinement with the rod or work and the rod or work is then automatically fed out of the spindle 2 and pushes the tool axially into the tool head and sets the slide or member 20 in its inoperative position.

This operation is automatically repeated until all the stock is used and then when the tool 5 is brought into alinement with the spindle 2, there being no rod in the spindle, the tool 5 is not moved rearwardly into the tool head and hence the slide or control member 20 remains projected out of the tool holder with its end 23 in the path of the arm 18 of the switch 15, so that upon the continued rotation of the head 3, the end 23 of the slide engages the arm 18 and throws the switch to engage the contact 16 with the contact 14 and thus closes the circuit through the bell. The sounding of the bell notifies the operator that the machine is ready for additional work, the operator then resets the switch, inserts a new rod 4 in the machine and again starts the machine.

What I claim is:

1. In an automatic metal working machine, in which the work is automatically fed to the tool and the tool automatically brought into operative relation to the work, the combination of a work spindle and a tool head, a tool holder carried by the head, a tool carried by the holder, normally in ineffective position and arranged to be shifted by the work into effective position, a control member arranged to shift the tool into ineffective position and to be shifted by the tool into inoperative position when the tool is shifted by the work, and means for indicating the absence of work in the spindle arranged to be operated by the control member when in operative position after the tool has been carried by the head out of working position.

2. In an automatic metal working machine, in which the work is automatically fed to the tool and the tool automatically brought into operative relation to the work, the combination of a work spindle and a tool head, a tool carried by the head, normally arranged in inoperative position and movable into operative position by the work, a control member arranged to shift the tool into inoperative position and the tool being shiftable by the work to operative position and thereby resetting the control member, means arranged to be operated by the control member when in its operative position and during shifting of the tool head for indicating the absence of work in the spindle and means for resetting the control member in its operative position after it has passed the former means and during further movement of the tool head.

3. In an automatic metal working machine, in which the work is automatically fed to the tool and the tool automatically shifted into operative relation to the work, the combination of a work spindle and a tool head, means including a member carried by the head for indicating the absence of work in the spindle, said member being normally in operative position as it approaches the work and movable into inoperative position by the work and means for moving said member into operative position as the tool is carried by the tool head into working position.

4. In an automatic metal working machine, in which the work is automatically fed to the tool and the tool automatically brought into operative relation to the work, the combination of a work spindle and a tool head, a tool holder carried by the head, a tool supported by the holder, a control member coacting with the tool to shift it into ineffective position as it approaches the work and the tool being arranged to be shifted into effective position by the work and shift said member into inoperative position, means operated by said member when in operative position to indicate the absence of work in the spindle and means for resetting said member in operative position and the tool in ineffective position as the tool approaches the work.

5. In an automatic metal working machine, in which the work is automatically fed to the tool and the tool automatically brought into operative relation to the work, the combination of a work spindle and a tool head, a means associated with the head for supporting the tool and comprising a shiftable control member arranged to shift the tool into ineffective position as the tool approaches the work and the tool being arranged to be moved into effective position and thereby shift said member into inoperative position, means operated by said member when in operative position and when the tool is in ineffective position to indicate the absence of work in the spindle, and means for resetting said member in operative position after it has been set by the tool in its inoperative position.

6. In an automatic metal working machine, in which the work is automatically fed to the tool and the tool automatically brought into operative relation with the work, the combination of a spindle and a tool head, a tool holder carried by the head, a movable member carried by the tool holder, a tool carried by the tool holder, the member and the tool having coacting means whereby movement of said member shifts the tool into ineffective position and movement of the tool by the work shifts said member into inoperative position, means including a shiftable part arranged in the path of said member when in inoperative position to indicate the absence of work in the spindle as the tool holder is moved by the head out of its working relation to the work, and means for resetting said member and thereby moving the tool into inoperative position as the tool approaches the work by the movement of the head.

7. In an automatic metal working machine, in which the work is automatically fed to the tool and the tool automatically brought into operative relation with the work, the combination of a work spindle and a tool head, a tool holder, a tool movably mounted in the holder and movable in one direction into effective position by the work, a member carried by the tool holder, the tool and said member having coacting means arranged so that movement of the tool shifts said member and movement of said member shifts the tool into ineffective position, means arranged to be engaged by said member during movement of the head when carrying the tool away from the work, and to indicate the absence of work in the spindle and means for resetting said member in its operative position and the tool in its ineffective position as the tool is carried by the head toward the work.

8. In an automatic metal working machine, in which the work is automatically fed to the tool and the tool automatically brought into operative relation to the work, the combination of a spindle and the tool head, a tool holder carried by the head, a tool slidable in the head and movable into effective relation by the work in the spindle, a slide movable transversely of the tool holder, the slide and the tool having coacting means whereby movement of the slide shifts the tool into ineffective position and movement of the tool by the work shifts the slide into inoperative position and means arranged in the path of the slide when in operative position and during movement of the tool holder away from the work, to indicate the absence of work in the spindle and means for resetting the slide in the normal operation to shift the tool into ineffective position as it is carried into working position by the head.

9. In an automatic metal working machine in which the work is automatically fed to the tool and the tool automatically brought into operative relation to the work, a control member and means by which the feeding movement of the work operates the control member from an operative to an inoperative position and means operated by the control member when in operative position to indicate the absence of work in the work spindle of the machine and means for resetting said member in operative position after each operation of the machine.

In testimony whereof, I have hereunto signed my name, at Syracuse, in the county of Onondaga, and State of New York, this 31st day of July, 1924.

WALTER W. BAKER.